United States Patent [19]
McDowell

[11] 3,987,945
[45] Oct. 26, 1976

[54] COLLAPSIBLE CONTAINER DETACHABLY SECURED TO VEHICLE SEAT

[75] Inventor: Mabel F. McDowell, Gridley, Calif.

[73] Assignee: The Raymond Lee Organization, Inc., New York, N.Y. ; a part interest

[22] Filed: Apr. 17, 1975

[21] Appl. No.: 568,980

[52] U.S. Cl. .............................. 224/42.42 A; 220/7
[51] Int. Cl.[2] ........................................... B60R 7/04
[58] Field of Search ............. 224/42.42 A, 42.45 B, 224/29 R, 29 D, 29 H, 42.42 R, 42.45 R, 42.1 E, 32 R, 33 R, 33 A; 220/6, 7, 323

[56] References Cited
UNITED STATES PATENTS

| | | |
|---|---|---|
| 1,967,506 | 7/1934 | Harrison ............................ 220/7 X |
| 2,517,178 | 8/1950 | Cheatham ........................... 220/7 X |
| 2,678,682 | 5/1934 | Thomas ..................... 224/42.42 A X |
| 3,338,629 | 8/1967 | Drées ....................... 224/42.42 A X |

Primary Examiner—Robert J. Spar
Assistant Examiner—Jerold M. Forsberg

[57] ABSTRACT

A horizontal rectangular base may be detachably secured to a conventional bench-type automobile seat by placing two like, parallel, flexible, flat arms that extend downwardly and rearwardly away from the rear end of the base into the space between the back and bottom of the seat. Upon the base are four rectangular walls that are hingedly mounted in a manner that the walls can all be folded flat above the base, or locked into vertical planes by lock means. The walls, base and arms are made of clear plastic.

2 Claims, 5 Drawing Figures

U.S. Patent    Oct. 26, 1976    3,987,945
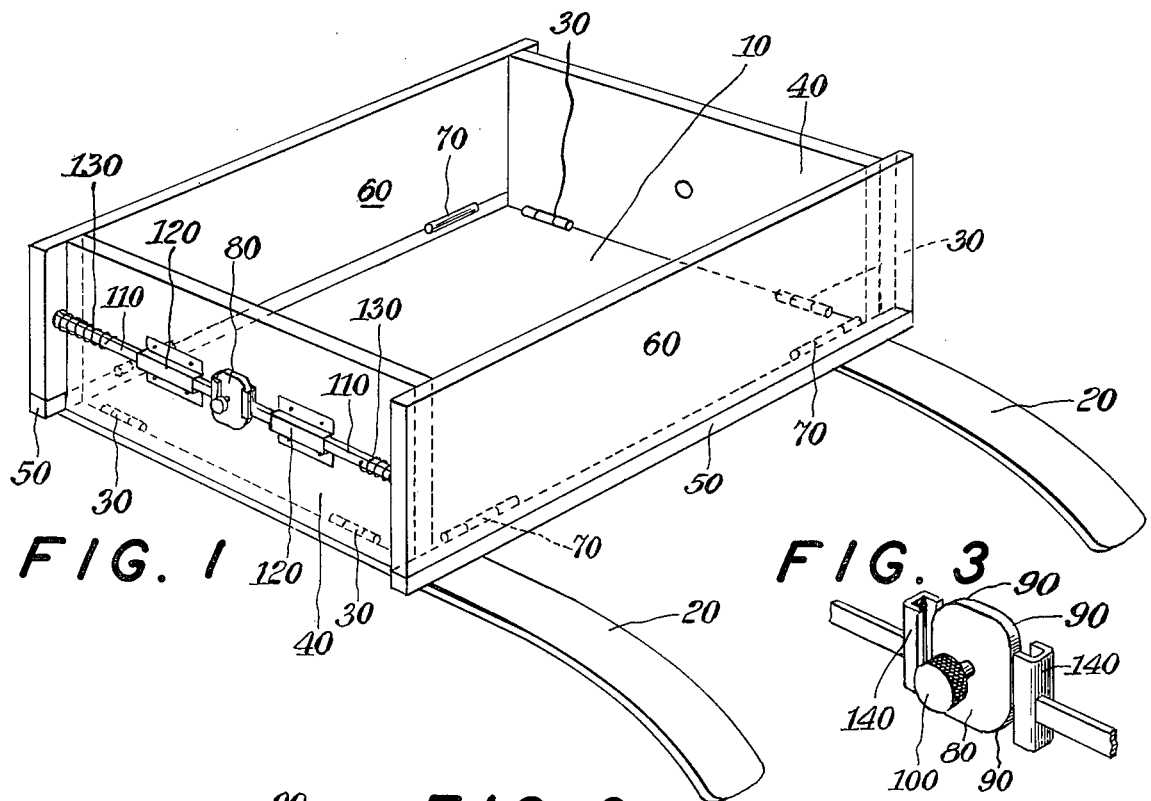
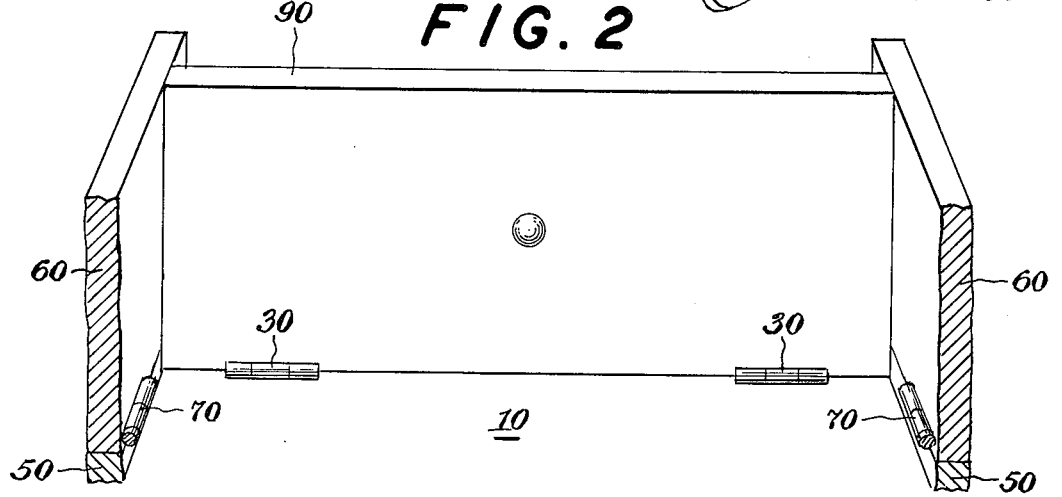
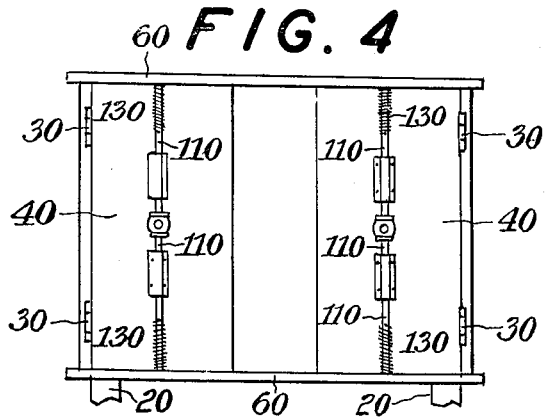
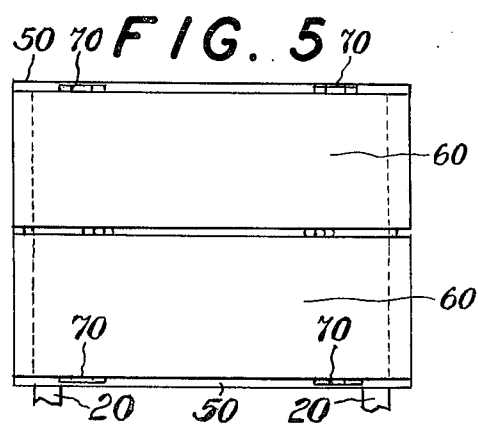

COLLAPSIBLE CONTAINER DETACHABLY SECURED TO VEHICLE SEAT

SUMMARY OF THE INVENTION

The object of the invention is to provide a container that can be detachably secured to a conventional bench-type automobile seat when needed, and that can be collapsed to a flat position for storage under the bottom of the seat when not required. Thus, a horizontal rectangular base has two like parallel flat rearwardly and downwardly extending and flexible arms attached to its rear end. These arms can be placed in the space between the back and bottom of a conventional bench-type automobile seat, to detachably secure the base to the seat.

Hingedly attached to the base are four rectangular walls. The two like, opposed side walls are hingedly attached directly to the sides of the base to fold flat on top of the base for storage. Each of the two like opposed end walls is hingedly attached to the horizontal top surface of a corresponding end strip that is attached to an end of the base. The purpose of the end strips is to provide vertical clearance to allow the end walls to be folded flat on top of the side walls after the latter have been folded flat on top of the base. Lock means allow the walls to be locked into vertical positions to form a container, or allow the walls to be folded flat for storage underneath the seat.

BRIEF DESCRIPTION OF THE DRAWINGS

FIG. 1 is a perspective drawing of the invention.
FIG. 2 is an inside view of a side wall.
FIG. 3 is a detail view of the cam of the lock means.
FIG. 4 is a top view of the invention with the side walls collapsed.
FIG. 5 shows the invention in a fully collapsed state.

DETAILED DESCRIPTION OF PREFERRED EMBODIMENTS

A horizontal rectangular base 10 has a pair of like, flexible, parallel, flat downwardly and rearwardly extending arms 20 attached to its rear end. These arms may be placed in the space between the back and bottom of a conventional bench-type automobile seat (not shown) to detachably secure the invention to the seat.

Hinges 30 hingedly attach each of two like rectangular side walls 40 to opposite sides of the base, in a manner that the side walls can be folded flat upon the base or can be raised to vertical orientations, as shown in FIGS. 1 and 2. Two like upwardly extending end strips 50 have horizontal top surfaces. Each of two like, rectangular end walls 60 is attached to the top surface of a corresponding end strip by hinges 70. The end strips allow sufficient vertical clearance so as to allow the end walls to be folded to a horizontal position above the side walls when the latter are folded flat upon the base. As can be seen in FIGS. 1 and 2, the walls can all be raised to vertical positions, with the side walls being disposed inside the end walls. To keep the walls in vertical positions to form a container, lock means are disposed on the outside surface of each side wall. Each lock means is characterized by a rectangular cam 80 with rounded corners 90 that is pivotally secured to the side wall, and is manually rotatable by knob 100. Two like opposed elongated bars 110 are slidably attached to each side wall by hollow housings 120, and are placed on opposed sides of the cam. The bars extend outwardly from the ca, cam, each has one end of a compression spring 130 attached to its outward end to bias the bar towards the cam by pressing the bar away from the end wall against which the free end of the spring is pressed.

On the end of each bar nearest the cam is placed a slotted member 140 that engages the cam. When the walls are to be locked in vertical positions, the cam is rotated until the long dimension of the cam is between the members 140, pushing the outward ends of the bars into holes (not shown) in the inside surfaces of each end wall against the pressure of the spring. When the cam is then rotated 90°, the springs push the bars back up against the cam. It is to be noted that each end strip serves to limit the travel of a corresponding end wall, so that the springs do not push the end walls outwardly past the vertical. The walls, base and arms are all made of clear plastic.

While the invention has been described with detailed reference to the drawings, the protection sought is to be limited only by the terms of the claims which follow.

I claim:
1. A collapsible container for use with conventional bench-type automobile seats, comprising:
   a horizontal rectangular base;
   two like, opposed rectangular side walls, each side wall being hingedly attached to a corresponding side of the base in a manner that the side walls may be folded inwardly towards each other to lie flat on top of the base;
   two like, opposed end strips having horizontal top surfaces, each end strip being attached to a corresponding end of the base;
   two like, opposed rectangular end walls, each end wall being hingedly attached to the top surface of a corresponding end strip, in a manner that the end walls may be folded up to vertical positions to enclose the side walls between them, and may be folded inwardly towards each other to lie flat upon the side walls after the side walls have been folded to lie flat upon the base;
   lock means disposed upon each side wall and cooperating with both end walls, in a manner that the lock means will lock all the walls into vertical orientations when locked and will leave all the walls free to be folded flat when unlocked, each lock means has a manually rotatable cam disposed on the outside surface of a corresponding side wall and each lock means further has a pair of like opposed elongated bars biased inwardly towards each cam and slidably attached to the outside surface of a corresponding side wall, each bar may be pushed outwardly away from each other by the cam as the cam is rotated and subsequently allowed to return to their original positions as the cam is further rotated; and
   two like parallel flexible flat arms fixed to and extending downwardly and rearwardly from the rear end of the base, whereby the device may be detachably secured to a conventional bench-type automobile seat by placing the arms in the space between the back and the bottom of the seat.
2. The device of claim 1 wherein the walls, base and arms are made of clear plastic.

* * * * *